United States Patent Office 3,436,198
Patented Apr. 1, 1969

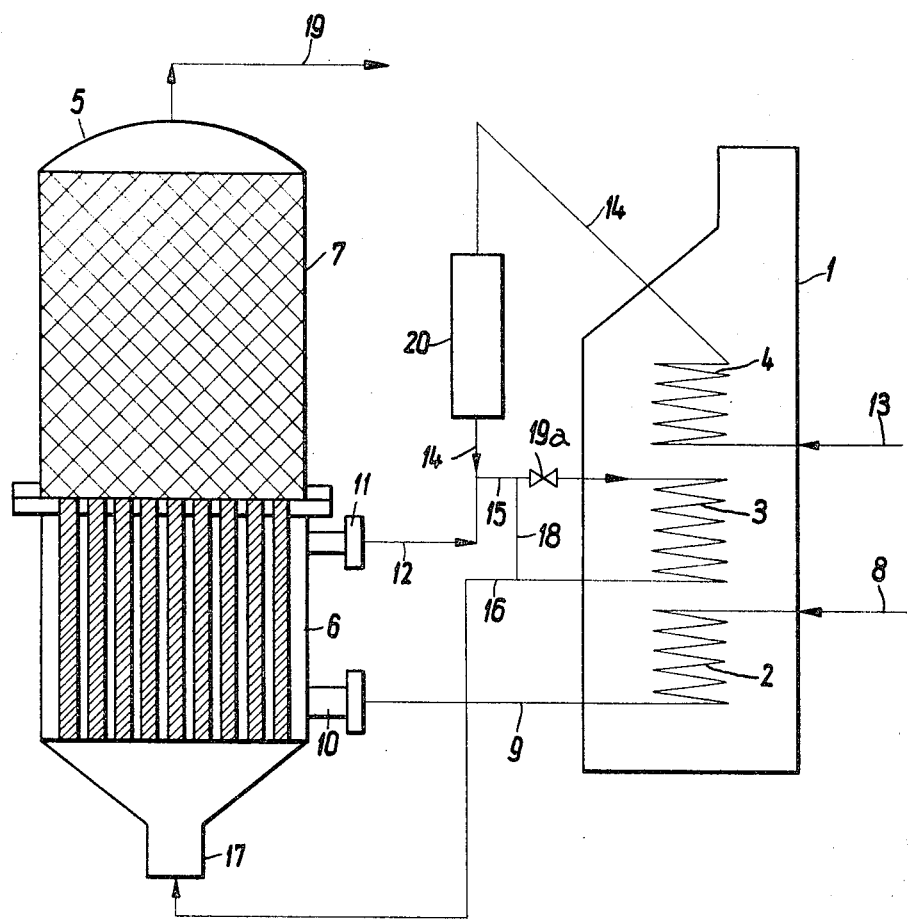

3,436,198
PROCESS FOR THE MANUFACTURE OF
METHANE-RICH GASES
Gerhard Baron, Frankfurt am Main, Erwin Ehrhardt, Sprendlingen, and Horst Bechthold, Frankfurt am Main, Germany, assignors to Metallgesellschaft Aktiengesellschaft, Frankfurt am Main, Germany
Filed Aug. 5, 1965, Ser. No. 477,616
Claims priority, application Germany, Aug. 5, 1964,
M 61,993
Int. Cl. C10g 11/28
U.S. Cl. 48—214   3 Claims

ABSTRACT OF THE DISCLOSURE

Methane-rich gas is produced from hydrocarbons having 3–10 carbon atoms and an upper boiling point of 200° C. by contacting the hydrocarbon in vapor phase, together with water vapor, in a first catalytic stage at an initial temperature of up to about 450° C. Hydrocarbon compounds are cracked, producing hydrogen in the gas mixture. The catalyst is maintained at a temperature of less than about 550° C. by heating. The effluent gas of the first stage is contacted with a more active catalyst in the second stage at a temperature of about 460–540° C. Short-chain hydrocarbon compounds are cracked and hydrogenation occurs, producing methane.

---

It is in the prior art to transform liquid hydrocarbons into heating or synthesis gas by thermal or catalytic cleavage in the presence of water vapor and/or gases containing oxygen such as air or technical oxygen.

The thermal or thermal-catalytic cleavage of hydrocarbons known as cracking, which is performed without any additives or with the addition of very small amounts of steam, produces a gas fraction of high caloric value consisting of hydrogen and hydrocarbons of 1 to 4 carbon atoms, but it cannot be called a complete transformation, because liquid hydrocarbons and coke are also developed by it.

The transformation of liquid hydrocarbons into synthesis gases consisting mainly of CO and $H_2$ can be performed by oxidative cleavage with oxygen or by cleavage with oxygen and steam. The necessity of using pure oxygen for the manufacture of nitrogen-free product gases may represent an economic burden. The advantage of cleavage in the presence of oxygen lies in the fact that it does not require any indirect input of heat and can be performed in shaft furnaces. The thermal or thermal-catalytic cleavage of liquid hydrocarbons with steam alone, i.e., with free oxygen or free hydrogen excluded, requires the indirect input of heat, which is performed either by separate preheating of the reactants or by the use of tube furnaces. This procedure is preferred whenever the product gas is to be free of nitrogen, e.g., for the production of synthesis gas, which in turn can be transformed to hydrogen by converting the carbon monoxide with water vapor to carbon dioxide and washing out the later.

An important present-day problem is the transformation of liquid hydrocarbons to rich gases with a high methane content. In large-area fuel gas distribution and in long-distance gas pipeline systems it is of great industrial and economic importance to transport the greatest possible caloric value per unit of volume of the gas.

The prior art methods for the production of gases very rich in caloric value operate in a plurality of stages making use of technically pure oxygen in one stage or in both stages, or they operate in a cyclical process under normal pressure, the heat requirements being supplied by a regenerative system. In this case, particularly in the phase alternation of the regenerative system, undesired byproducts occur, some of them liquid.

Another known process, which can be operated continuously, transforms light, low-boiling hydrocarbons into a gas of high caloric content by cracking the hydrocarbon in a hot, hydrogen-rich gas at normal or elevated pressure. In this process, too, undesired liquid byproducts occur, especially aromatics, like benzene, toluene, naphthaline and the like.

British Patent 820,257 describes a continuous process for the manufacture of methane-rich gases from hydrocarbons with 4 to 10 carbon atoms per molecule, wherein the hydrocarbons are mixed with water vapor at normal or elevated pressure, heated to a temperature between 350° and 500° C., and then passed over a catalyst containing nickel whose temperature is to adjust itself during the reaction to 400° to 550° C. Preferably, pressures between 10 and 25 atmospheres and a ratio of 2 to 5 weight-parts of steam per weight-part of hydrocarbons are employed. This process is based upon a sequence of reactions in which the mixture of liquid hydrocarbons is transformed in part by means of steam to methane and carbon dioxide, and cleaved in part to carbon monoxide and hydrogen. Carbon dioxide and methane can continue to react with the formation of carbon monoxide and hydrogen. The carbon monoxide can in turn form carbon dioxide and hydrogen with any water vapor that may still be present after the water-gas reaction.

It is apparent even from thermodynamic and kinetic considerations that this process can be performed only in a narrow range of operating conditions, in order that its thermal economy may be maintained.

The hydrocarbon mixture to be gassified must consist mainly of low hydrocarbons. If, for example, a mixture consisting mainly of $C_7$ to $C_{10}$ is reacted with water vapor at the catalyst, it is necessary, in order to maintain the temperature in the catalyst bed, to heat the reaction mixture to such an extent that, regardless of the steam added, cracking reactions begin to take place, which impair the reactivity of the starting material and the activity of the catalyst, which form polymerizable substances, and which can lead to the precipitation of carbon black.

An increase in the preheating temperature promotes in the catalyst bed the endothermic reactions which produce carbon monoxide and hydrogen, which results in a temperature decrease in the catalyst bed. But when the catalyst temperatures decrease, the relative excess of carbon monoxide causes the formation of carbon and carbon dioxide (Boudouard's equilibrium), because the nickel-containing catalysts of the prior art promote the Boudouard reaction better than they do the homogeneous water-gas reaction.

The results achieved by the process taught by British Patent 820,257, on which a report was given by R. G. Coekerham and G. Percival of the British Gas Council at the 147th National Meeting of the American Chemical Society in April 1964, confirms entirely these foreseeable peculiarities.

In the transformation of hydrocarbon mixtures with a high average number of carbon atoms, the above-named reactions are accompanied by reactions which are hard to control and lead to the formation of polymers and carbon black, and which uneconomically shorten the life of the catalyst. It has been found that these disadvantages, which lead to frequent interruptions of operations and to catalyst damage, can be prevented if the hydrocarbon mixture to be gassified is preheated to a maximum of 450° C., regardless of the boiling range and final boiling point, and is then passed over a cleavage catalyst of low activity, which favors exothermic reactions over endothermic reactions, and is held by indirect heating to at least 400° C. and at most 550° C., before it is transformed in a prior art manner on a more active catalyst, at temperatures of about 460 to 540° C., in order to form the desired high methane content.

Accordingly, the invention relates to a process for the manufacture of methane-rich gases by catalytic hydrogenating cleavage of hydrocarbons with 3 to 10 carbon atoms per molecule and the upper boiling point limit of about 200° C., with water vapor, and, if desired, in the presence of hydrogen on cleavage catalysts under normal or elevated pressure at temperatures above 350°C.

The process of the invention is characterized by the fact that the mixture of hydrocarbons and water vapor is preheated to a maximum of 450° C., and is then fed through a cleavage catalyst of low activity kept by indirect heating at 450 to 550°C., before it is further reacted in a prior art manner on a more active catalyst.

Known cracking catalysts containing up to 20 percent nickel on alumina-base supporting material can be used as the catalyst of low activity. Other suitable catalysts are, for example, supported catalysts with 10 to 30 percent cobalt and with additions of tungsten, chromium, copper, molybdenum, potassium, or sodium.

The indirect heating of the comparatively low-activity catalyst can be performed in a tube furnace by means of indirect heat exchange with superheated steam, which is thereafter mixed with the starting material. The starting material can be desulfurized before combining with steam, if desired. The mixture is preheated, if necessary to 400 to 450°C., and is then passed over the catalyst, which is indirectly heated in the tube furnace. The preheating temperature depends on the boiling point situation of the hydrocarbons used and on the amount of steam added. The higher the average carbon number of the hydrocarbon mixture is, the lower is the preheating temperature, and the smaller the amount of steam that is added. The higher hydrocarbons are preferentially decomposed in the tube furnace.

The bed of the more active cleavage catalyst can directly follow the tube furnace. The gas entering this bed contains hydrogen, and contains hardly any hydrocarbons above $C_4$. Approximately 50 to 70 percent of the starting mixture of hydrocarbons has already been transformed in the tube furnace.

On account of its hydrogen content, this mixture can be transformed to a gas on a more active cleavage catalyst without the danger of formation of polymers and carbon black; after the carbon dioxide has been washed out, the gas from the active cleavage catalyst consists mainly of methane and contains substantially nothing but hydrogen in addition to that. This gas is the same in all properties as the high-caloric natural gases.

Active cleavage catalysts are, for example, prior art catalysts containing 30 to 50 percent nickel on a support of alumina and magnesium oxide.

An advantage of the process of the invention lies in its reliability of operation, which remains unchanged for a long period.

This, in turn, is based on the fact that the hydrocarbons are made to react with water vapor at a constant, relatively low temperature, at which thermal decomposition still does not take place, on a catalyst of low activity and correspondingly low sensitivity (from the gross transformation viewpoint), in endothermic reactions which can be influenced from without by varying the thermal input, in such a manner that an intermediate product develops which contains hydrogen. This intermediate product is then subjected to further reaction on the more active cleavage catalyst in an exothermic reaction with a moderated evolution of heat, so that, due to the presence of hydrogen, no formation of polymers or free carbon (carbon black) can occur.

If the starting materials are preheated as in the prior art process to such an extent that the entire thermal economy is provided for by the perceptible heat of the reactants introduced, the decomposition temperature of the introduced hydrocarbons may be exceeded even during the heating process. Furthermore, the reactions at the input side of the catalyst bed result in the preferential formation of carbon monoxide and hydrogen with a reduction of temperature, while the formation of carbon black by the Boudouard reaction is promoted. Since at the beginning of these reactions the hydrogen concentration is still slight, the formation of polymers and carbon black is greatly favored. An important feature of the invention consists in causing the cleavage reaction to run almost isothermally in a narrow range of temperatures. This is done by heating the catalyst indirectly by means of the steam which then flows through the heated catalyst in mixture with the hydrocarbons to be cleaved. This endothermic reaction stage can be carried out in a tube furnace the tubes of which are filled with the catalyst, while the heating steam flows outside the tubes. The catalyst container in which the exothermic reactions take place can be flange mounted on the tube furnace, or it is in the form of a multitube insert in the reactor.

The figure shows by way of example a schematic diagram of a plant for the performance of the process of the invention.

The plant consists substantially of the heater 1 with the heating elements 2, 3 and 4, and the reactor 5 with the indirectly heated catalyst container 6 and the catalyst chamber 7. A purifier 20 can be provided for the removal of sulfur from the gasoline.

The heating elements 2, 3 and 4 in heater 1, which is heated appropriately with gas or oil for example, serve for the production of superheated steam (2), for the vaporization of the gasoline (4) and for any necessary reheating of the reaction mixture of gasoline vapor and water vapor (3).

Feed water is introduced into heating elements 2 through the pipe 8, and it is there transformed to steam with a temperature of 450 to 600° C. This steam is carried through pipe 9 and connection 10 into the heat-yielding passage in the catalyst container 6 and is carried from the latter at about 400° C. through connection 11 and pipe 12. In pipe 12, this steam is mixed with the vapors of the gasoline that is to be cleaved. The gasoline is introduced through pipe 13 into the heating element 4 and is vaporized and heated therein. If necessary, the vapors are conducted through line 14 into a desulfurizing apparatus 20 of the prior art, and then they enter into line 14. The desulfurizing apparatus may include a hydrogenating precatalyst containing, for example, cobalt and molybdenum, and a purifying composition made, for example, of zinc oxide or alkalinized iron oxide.

The mixture of water vapor and gasoline vapor from lines 12 and 14 is now carried in whole or in part through the heating element 3 by means of line 15 for reheating as needed, and then flows through line 16 to the connection 17 of the indirectly heated catalyst container 6. The mixture has a temperature of 400 to 450° C. when it enters the catalyst container, and it is controlled so that no thermal decomposition of the hydrocarbons can yet take place. In order to adjust this temperature, a part of the flow of the mixture of water vapor and gasoline vapor can be carried by line 15 through the heating element 3, while the rest of the flow bypasses heating element 3 through line 18 and enters directly into line 16. A throttling means 19a is provided in line 15 to adjust the flow of the partial currents. The mixture introduced through connection 17 into the reactor 5 flows through the tubes filled with catalyst and the catalyst chamber 7. A mixture of methane, hydrogen and carbon dioxide is drawn off through line 19 as the product gas which, after the washing out of the carbon dioxide by conventional methods, is a rich gas similar to natural gas.

EXAMPLE I

A methane-rich gas is manufactured from gasoline by the process of the invention. The characteristics of the gasoline were as follows:

| | | |
|---|---|---|
| Boiling range | °C | 100–185 |
| C | weight-percent | 85.6 |
| H | do | 14.4 |
| Paraffins | do | Approx. 60 |
| Aromatics | do | Approx. 15 |
| Olefins | do | Approx. 1 |
| Naphthalenes | do | Approx. 24 |
| Naphthaline | p.p.m | 32 |
| Density (20° C.) | g./cm.$^3$ | 0.76 |

For each kilogram of this gasoline that is fed through line 13, 3 kilograms of water are introduced through line 8.

For a discharge temperature of 490° C. in the methane-rich product gas in line 19, the following conditions prevail in the plant: the water vapor has a temperature of 600° C. in line 9 before entry into the heat-yielding side of the tube furnace, and when it departs from same it has a temperature in line 12 of 500° C.

The temperature of the gasoline-water vapor mixture in line 16 is adjusted to 450° C. at the point of entry 17 into the tube furnace 6 of reactor 5. The intermediate product passing from the tube furnace 6 into the catalyst bed 7 has the following composition:

| | Vol.-percent |
|---|---|
| $CO_2$ | 16 |
| CO | 2 |
| $H_2$ | 23 |
| $CH_4$ | 30 |
| $C_2$–$C_5$ | 29 |

The product gas in line 19 contains:

| | | |
|---|---|---|
| $CO_2$ | vol. percent | 24 |
| CO | do | 2 |
| $H_2$ | do | 20 |
| $CH_4$ | do | 54 |
| $C_2$–$C_5$ | do | 0 |
| Relative density (air=1) | | 0.700 |
| Gross calorific value | kcal./Nm.$^3$ | 5820 |

Two Nm.$^3$ of this product gas are obtained from 1 kg. of gasoline and 3.0 kg. of water vapor. After the carbon dioxide is washed out, 1.52 Nm.$^3$ remains of a rich gas containing:

| | | |
|---|---|---|
| CO | vol.-percent | 2.6 |
| $H_2$ | do | 26.4 |
| $CH_4$ | do | 71.0 |
| Relative density (air=1) | | 0.436 |
| Gross calorific value | kcal./Nm.$^3$ | 7660 |

EXAMPLE II

A light gasoline with a 46–107° C. boiling range is made to react with 2 kg. of water vapor per kg. of gasoline. The characteristics of the gasoline are as follows:

| | | |
|---|---|---|
| C | weight-percent | 84.3 |
| H | do | 15.7 |
| Paraffins | do | 81 |
| Aromatics | do | 4 |
| Naphthenes | do | 15 |
| Density (20° C.) | g./cm.$^3$ | 0.68 |

For a discharge tempearture of 460° C. in the methane-rich product gas in line 19 the following conditions prevail in the apparatus: the water vapor before entering the heat-yielding side of the tube furnace has a temperature of 600° C. in line 9; when it leaves the tube furnace, it has a temperature of 500° C. in line 12.

The temperature of the gasoline-water vapor mixture in line 16 is adjusted to 450° C. at the point of entry 17 into the tube furnace 6 of reactor 5. The intermediate product passing from the tube furnace 5 into catalyst bed 7 has the same composition as the intermediate product in Example I.

The product gas in line 19 contains:

| | | |
|---|---|---|
| $CO_2$ | vol.-percent | 22 |
| CO | do | 1 |
| $H_2$ | do | 17 |
| $CH_4$ | do | 60 |
| $C_2$–$C_5$ | do | 0 |
| Relative density (air=1) | | 0.692 |
| Gross calorific value | kcal./Nm.$^3$ | 6270 |

1.9 Nm.$^3$ of this product gas are obtained from 1 kg. of gasoline and 2.0 kg. of water vapor. After the carbon dioxide is washed out, 1.48 Nm.$^3$ remain of a rich gas containing:

| | | |
|---|---|---|
| CO | vol.-percent | 1.3 |
| $H_2$ | do | 21.7 |
| $CH_4$ | do | 77.0 |
| Relative density (air=1) | | 0.455 |
| Gross calorific value | kcal./Nm.$^3$ | 8.50 |

Thus, the invention provides for production of heating gas from a mixture of hydrocarbons containing 3–10 carbon atoms and having an upper boiling limit of about 200° C. The hydrocarbon mixture is combined with water vapor as a gas mixture and the gas mixture is contacted with a low activity catalyst at an initial contacting temperature for the gas of up to about 450° C., for endothermic cracking of longer chain hydrocarbon compounds. This produces hydrogen in the gas mixture. During this contacting with low activity catalyst, the temperature is maintained at less than about 550° C. Following the said contacting, the gas mixture is contacted with a more active catalyst for exothermic cracking of shorter chain hydrocarbon compounds. If desired, some hydrogen can be included in the gas mixture of water vapor and hydrocarbons fed to the low activity catalyst. The low activity catalyst can be a supported nickel catalyst containing up to about 20 percent nickel, and the more active catalyst can be a supported nickel catalyst containing up to about 30–50 percent nickel.

The preferred temperature for the contacting with low activity catalyst is 450–550° C. The temperature of contacting with the high activity catalyst can be as is known for use of such catalyst to crack hydrocarbons in the presence of water vapor (British Patent 820,257), and is preferably 460–540° C.

While the invention has been described with respect to particular embodiments thereof, these embodiments are merely representative and do not serve to set forth limits of the invention.

What is claimed is:

1. Process for the production of methane-rich gas from a mixture of hydrocarbons containing 3–10 carbon atoms and having an upper boiling limit of about 200° C., which comprises:

(a) combining said hydrocarbon mixture with water vapor as a gas mixture;
   (b) contacting the hydrocarbon, water vapor gas mixture with a low activity cracking catalyst at an initial contacting temperature for the gas of up to about 450° C., for endothermic cracking of longer chain hydrocarbon compounds producing hydrogen in the gas mixture;
   (c) maintaining the temperature during said contacting with low activity catalyst at less than about 550° C. by heating by indirect heat exchange;
   (d) thereafter contacting the gas mixture at about 460–540° C. with a more active cracking catalyst for exothermic cracking of shorter chain hydrocarbon compounds and hydrogenation to produce methane.

2. The process of claim 1, wherein the low activity catalyst is a supported nickel catalyst containing up to about 20 percent nickel, and the more active catalyst is a supported nickel catalyst containing about 30–50 percent nickel.

3. The method of claim 1, wherein about 50–70 mol percent of the hydrocarbon is cracked in the contacting with low activity catalyst.

References Cited

UNITED STATES PATENTS 3,106,457  10/1963  Lockerbie et al.

FOREIGN PATENTS 753,661  7/1956  Great Britain.
772,787  4/1957  Great Britain.
820,257  9/1959  Great Britain.
999,103  7/1965  Great Britain.

MORRIS O. WOLK, *Primary Examiner.*

R. E. SERWIN, *Assistant Examiner.*